United States Patent [19]

Asai et al.

[11] Patent Number: 4,924,432

[45] Date of Patent: May 8, 1990

[54] DISPLAY INFORMATION PROCESSING APPARATUS

[75] Inventors: Nobuteru Asai; Yasuo Sakai; Kazuo Miyazaki, all of Hitachi, Japan

[73] Assignee: Hitachi, Ltd., Tokyo, Japan

[21] Appl. No.: 31,676

[22] Filed: Mar. 27, 1987

[30] Foreign Application Priority Data

| | | | |
|---|---|---|---|
| Mar. 29, 1986 | [JP] | Japan | 61-72239 |
| Apr. 9, 1986 | [JP] | Japan | 61-80167 |
| Jul. 3, 1986 | [JP] | Japan | 61-154967 |

[51] Int. Cl.[5] .......... G06F 9/00

[52] U.S. Cl. .......... 364/900; 364/955; 364/956; 364/927.2; 364/927.5; 364/927.7; 364/957; 364/957.1; 364/966.3

[58] Field of Search .......... 340/721, 726, 799; 364/900, 200

[56] References Cited

U.S. PATENT DOCUMENTS

| | | | |
|---|---|---|---|
| 4,504,826 | 3/1985 | Leininger | 340/721 |
| 4,555,775 | 11/1985 | Pike | 364/900 |
| 4,663,617 | 5/1987 | Stockwell | 340/726 |
| 4,710,762 | 12/1987 | Yamada | 340/721 |
| 4,742,347 | 5/1988 | Arismendi | 340/799 |

*Primary Examiner*—Gareth D. Shaw

*Assistant Examiner*—John E. Mills

*Attorney, Agent, or Firm*—Antonelli, Terry & Wands

[57] ABSTRACT

The dot data to be displayed is divided and stored in an even address graphic memory and an odd address graphic memory. When data to be revised (refreshed) bridges over adjacent word units having different addresses, the CPU generates the word address of the odd address graphic memory and new dot data to be displayed. A peripheral control circuit generates the word address signal and an address signal of the adjacent address of the even address graphic memory so as to revise the dot data which bridges over two word addresses. In this way, the dot data which bridges over two addresses can be revised by only one access operation to the memory.

9 Claims, 19 Drawing Sheets

FIG. 5

| CONVERTED ADDRESS | CORRESPONDING CPU ADDRESS | | |
|---|---|---|---|
| | HORIZONTAL ADDRESS | VERTICAL ADDRESS (A) | VERTICAL ADDRESS (B) |
| CA16 | A16 | A16 | A9 |
| CA15 | A15 | A8 | A8 |
| CA14 | A14 | A7 | A7 |
| CA13 | A13 | A6 | A6 |
| CA12 | A12 | A5 | A5 |
| CA11 | A11 | A4 | A4 |
| CA10 | A10 | A3 | A3 |
| CA9 | A9 | A2 | A2 |
| CA8 | A8 | A1 | A1 |
| CA7 | A7 | A0 | A0 |
| CA6 | A6 | A15 | A16 |
| CA5 | A5 | A14 | A15 |
| CA4 | A4 | A13 | A14 |
| CA3 | A3 | A12 | A13 |
| CA2 | A2 | A11 | A12 |
| CA1 | A1 | A10 | A11 |
| CA0 | A0 | A9 | A10 |

FIG. 7

1024 DOTS (128 BYTES)

512 DOTS

1024 DOTS

| | | | | | |
|---|---|---|---|---|---|
| 0h<br>( 0h )<br>[ 0h ] | 1h<br>( 200h)<br>[ 400h] | 2h<br>( 400h)<br>[ 800h] | | 7Eh<br>(FC00h)<br>[1F800h] | 7Fh<br>(FE00h)<br>[1FC00h] |
| 80h<br>( 1h )<br>[ 1h ] | 81h<br>( 201h )<br>[ 401h ] | 82h<br>( 401h )<br>[ 801h ] | | FEh<br>(FC01h )<br>[1F801h] | FFh<br>( FE01h)<br>[1FC01h ] |
| 100h<br>( 2h )<br>[ 2h ] | 101h<br>( 202h)<br>[ 402h] | 102h<br>( 402h)<br>[ 802h] | | 17Eh<br>(FC02h)<br>[1F802h] | 17Fh<br>(FE02h)<br>[1FC02h] |
| | | | | | |
| | | | | | |
| FF80h<br>( 1FFh )<br>[ 1FFh ] | FF81h<br>( 3FFh )<br>[ 5FFh ] | FF82h<br>( 5FFh )<br>[ 9FFh ] | | FFFEh<br>(FDFFh)<br>[1F9FFh] | FFFFh<br>(FFFFh)<br>[1FDFFh] |
| 10000h<br>(10000h)<br>[ 200h ] | 10001h<br>(10200h)<br>[ 600h ] | 10002h<br>(10400h)<br>[ A00h ] | | 1007Eh<br>(1FC00h)<br>[1A00h ] | 1007Fh<br>(1FE00h)<br>[1FE00h] |
| | | | | | |
| | | | | | |
| 1FF80h<br>(101FFh)<br>[ 3FFh ] | 1FF81h<br>(103FFh)<br>[ 7FFh ] | 1FF82h<br>(105FFh)<br>[ BFFh ] | | 1FFFEh<br>(1FDFFh)<br>[1FBFFh] | 1FFFFh<br>(1FFFFh)<br>[1FFFFh] |

UPPER ROW : CPU HORIZONTAL ADDRESS
(MIDDLE ROW) : CPU VERTICAL ADDRESS (A)
[LOWER ROW] : CPU VERTICAL ADDRESS (B)

DISPLAY INFORMATION PROCESSING APPARATUS

BACKGROUND OF THE INVENTION

This invention generally relates to a display information processing apparatus and more particularly to a read/write display information processing apparatus suitable for fast reading/writing of display data with respect to a graphic memory and fast refreshing of display data on a display unit, the display data being representative of characters and graphics to be displayed on the display unit which uses, for example, a cathode ray tube (CRT) or liquid crystals for displaying the display data as in the case of word processors and personal computers or a printer for recording and displaying the display data.

In recent years, a display unit based on a bit map display scheme has been used widely for word processors and personal computers. This type of display unit employs, for the sake of displaying characters and graphics on the CRT or liquid-crystal screen, a graphic memory which has a large degree of freedom of display contents and a memory element of one bit corresponding to one bit of a display picture element or pixel.

The bit map display scheme is however disadvantageous in that display data for one display screen must be written bit by bit into the graphic memory, resulting in a low display speed and that when the display content is frequently refreshed, the load on a processor (hereinafter referred to as a CPU) is increased in order to perform the write processing, thus retarding processings for other modes of control.

Under the circumstances, a method has been proposed which is designed to speed up the processing for writing the display data into the graphic memory and to reduce the load applied on the CPU which is engaged in performing the write processing. A display system disclosed in JP-A-60-260989 corresponding to a Japanese Patent Application filed Jun. 8, 1984 by the inventor of the present application proposes reduction of the load on the CPU in the course of both the bit shift processing performed when writing write (refresh) data into the graphic memory and the combining processing of the write data and background data.

However, the above prior art display system fails to consider the way of accessing the memory for the sake of reading display data to be combined out of the graphic memory and writing the combined display data into the graphic memory, the way to reduce the amount of write data necessary for display refreshing and the way to efficiently utilize a memory area of the graphic memory which is not used as a display picture data memory area.

For example, in an apparatus in which the graphic memory is accessed on a time-share basis in order to prevent pictures from flickering when refreshing the screen, a graphic memory of a minimal 16-bit width structure is required to meet the screen which is, for example, of a raster of 1024 dots×512 dots. When a single graphic memory is constructed using four DRAM's each having a structure of 64 k bits×4 k bits, this graphic memory has a capacity of 128 k bytes. However, since the capacity of the display screen is 64 k bytes, a surplus 64 k byte memory area of the graphic memory is left unused as the display picture data memory area. Further, in the conventional display data processing, data for the entirety of the screen has to be revised when scrolling the screen, and in order to revised data which is bit-shifted beyond a word boundary when scrolling, the write processing must be carried out plural times to write the shifted data, resulting in a low processing speed.

SUMMARY OF THE INVENTION

An object of this invention is to provide a display information processing circuit capable of solving the above prior art problems.

According to the invention, to accomplish the above object, in a display information processing circuit providing for division of the display screen into a plurality of divisional screens, access address generation means, when supplied from data transfer means with a word address for one graphic memory indicative of a read position during reading of data by the data transfer means out of the one graphic memory, generates an access address applied to the one graphic memory designated by the word address and a different access address applied to the other graphic memory of a different word address which is adjacent to the word address for the one graphic memory. Read data generation means reads concurrently data from the two graphic memories based on the one graphic memory word address and the other graphic memory word address so as to obtain data crossing a word boundary. Accordingly, the read data, even when bridging across a boundary between two word addresses, can be read out of the graphic memories in one read processing operation.

When display data in a unit of a word, along with a word address indicative of a write position, supplied from the data transfer means during writing of the display data by the data transfer means into one graphic memory is shifted to exceed a word boundary, write data generation means generates write data written into one graphic memory at the word address and generates, from display data exceeding the word boundary, write data written into the other memory at a different word address which is adjacent to the word address for the one memory and the access address generation means generates access addresses for the two memories. This ensures that write data subject to the two word addresses can be written concurrently into the corresponding memories. Accordingly, the display data being transferred in a unit of one word, even when shifted to bridge over the two word addresses, can be stored into the graphic memories through one write processing. In accordance with the above operation, the transfer processing for reading display data bridging across two word addresses in the graphic memories and for writing display data at a position bridging across two word addresses can be completed through one read processing operation and one write processing operation.

A graphic memory boundary setting circuit is adapted to divide the graphic memory into a plurality of divisional memory areas and the address structure for a divisional area used for display is set to a vertical address structure, so that when display data is transferred to the graphic memory, the data transfer means can fulfill its fast continuous transfer function efficiently to permit transfer of a large amount of data through one data transfer.

In the memory area used for display, the data shift function is so set as to fulfill itself. The address structure for a different divisional memory area not used for display is set to a horizontal address structure which can permit the different divisional memory area to be used for data representative of pages, lines and the like and in the different divisional area, the data shift function is invalidated.

When the data transfer means accesses an area in which a vertical address is set, the graphic memory boundary setting circuit decides that the accessed area is a vertical address area and that the shift processing is permitted in the accessed area, and an address converter effects address conversion such that an address, as viewed from the data transfer means, on the accessed area takes a vertical address. Accordingly, even when the shift processing is required for data processing during accessing of the vertical address area, the data transfer means can fulfill its fast continuous transfer function irrespective of the shift processing during transfer operations so as to write display data into the graphic memory at a high speed.

When the data transfer means accesses an area in which a horizontal address is set, the graphic memory boundary setting circuit decides that the accessed area is a horizontal address area and that the shift processing is not needed in the accessed area, freeing data from the shift processing operation, and the address converter effects address conversion such that an address, as viewed from the data transfer means, on the accessed area takes a horizontal address. Accordingly, the horizontal address area not used for display can be used as a data area to thereby ensure efficient utilization of the graphic memory.

The address converter further divides the divisional memory area used for display into a plurality of further divisional areas and applies loop-like address conversion to at least one of the further divisional areas so as to establish a wraparound screen in a designated memory block, so that when the operator designates scrolling to view an upper or lower screen the content of which is invisible to the operator, the scroll operation is effected by changing the display start address and writing an area to be newly displayed on the screen. This can eliminate the necessity of transfer of a great amount of data, that is, moving of a block of all display data in a designated direction as in the case of the conventional screen scrolling processing. Further, since in the area for display data the address structure has a vertical address format, the advantage of the fast data transfer function characteristic of the data transfer means can be, the scrolling can be performed with a minimum number of data processings and within a minimum processing time, as compared to the conventional screen scrolling, to thereby permit a response to the operator designation to be displayed on the screen within a minimum time.

BRIEF DESCRIPTION OF THE DRAWINGS

FIG. 5 shows an address conversion correspondence table useful to explain address conversion in accordance with the invention;

FIG. 7 shows address conversion effected by the address converter in accordance with the invention;

DESCRIPTION OF THE PREFERRED EMBODIMENTS

An embodiment of a display information processing circuit according to the invention will now be described with reference to the accompanying drawings.

Figure 1:
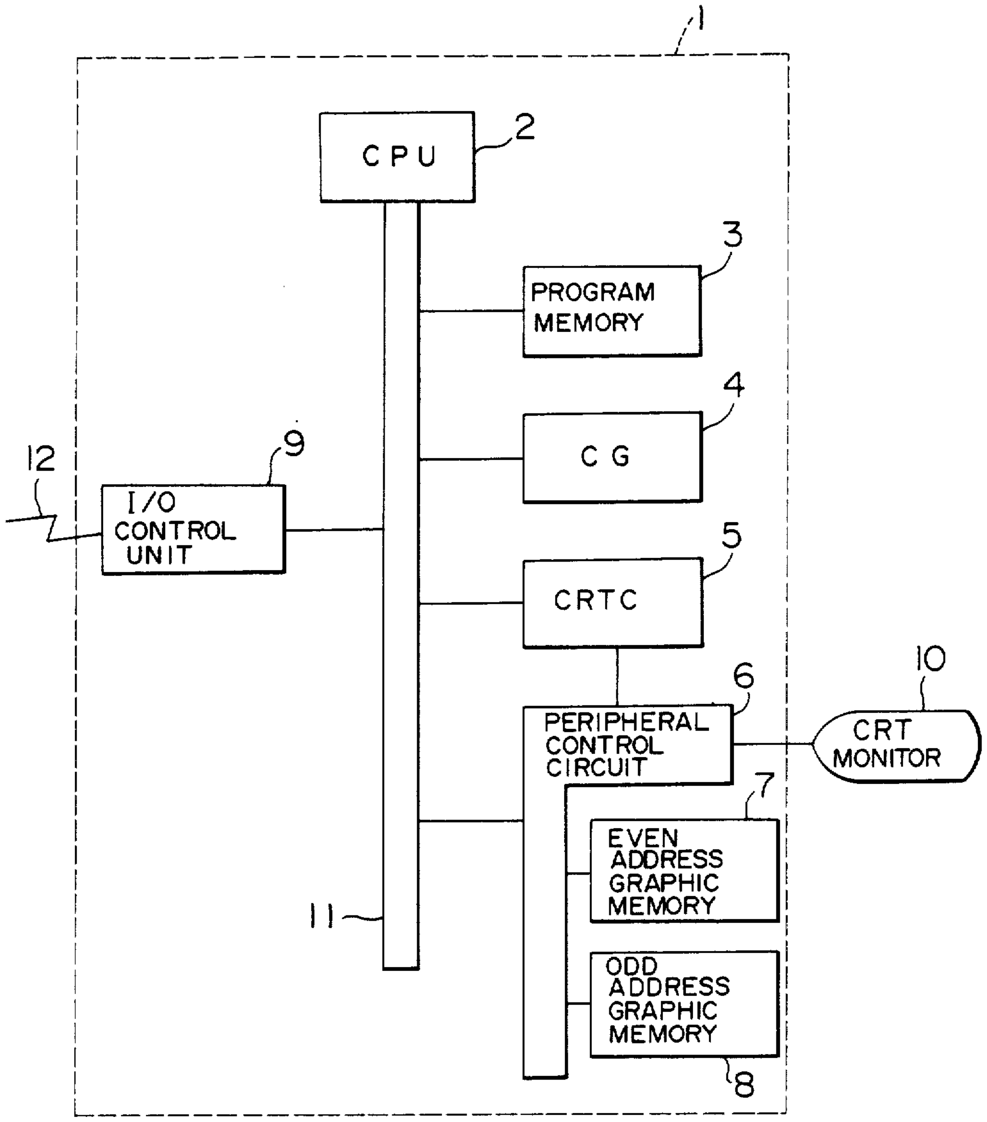
FIG. 1 is a block diagram illustrating a display information processing apparatus according to an embodiment of the invention.
Figure 8:
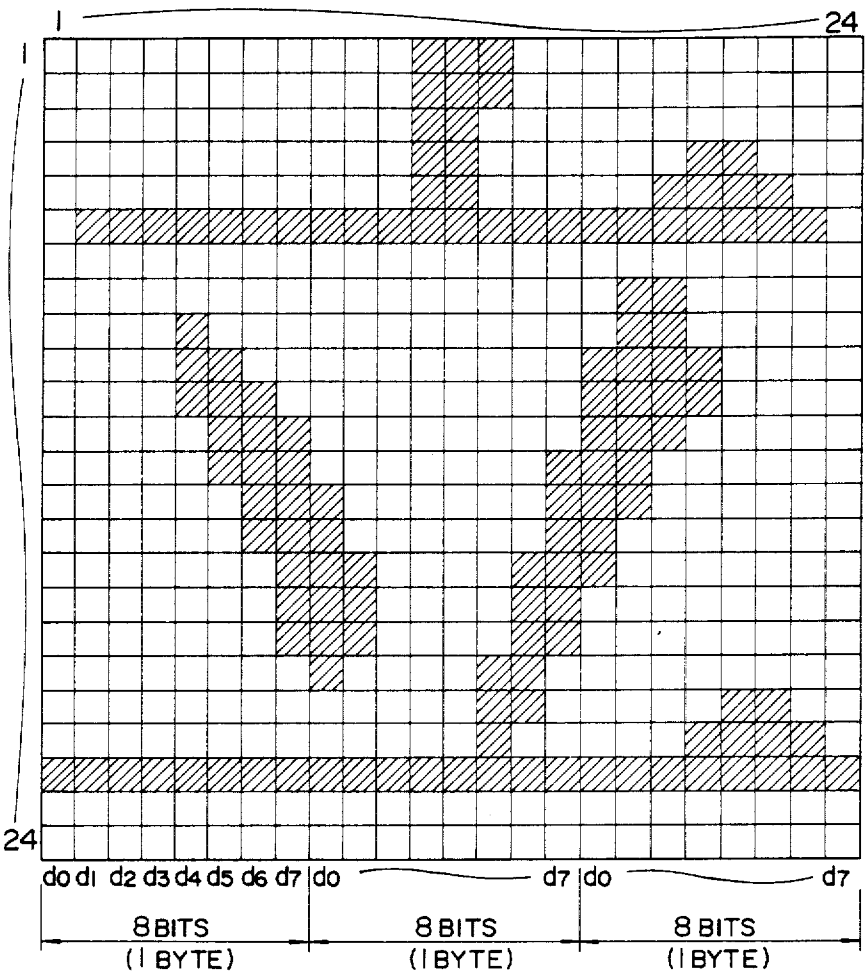
FIG. 8 is a diagram illustrating an example of a character pattern.

FIG. 1 shows the overall construction of a controller for monitor display to which the invention is applied. A CPU 2 performs operation control for the entirety of the display information processing circuit 1 and carries out data transfer in a unit of one byte (8 bits) with respect to memories and registers included in the display information processing circuit 1. A program memory 3 stores programs and data necessary for operating the display information processing circuit 1. A character generator (CG) 4 stores character pattern data for displaying a character pattern, such as shown in FIG. 8, on a CRT monitor 10. A CRT controller (CRTC) 5 generates an address and a sync signal which are both used for reading data to be displayed on the CRT monitor 10 from graphic memories 7 and 8. A peripheral control circuit 6 is responsive to a command from the CPU 2 to write the pattern data to be displayed on the CRT monitor 10 into designated positions in the graphic memories 7 and 8, and performs bit shift processings for the pattern data; generates addresses for the graphic memories 7 and 8 into which the pattern data is written; logically processes the old pattern data which already has been written into the graphic memories 7 and 8 and the pattern data to be displayed so as to prepare new pattern data; writes the new pattern data into the given addresses of the graphic memories; and reads the new pattern data from the graphic memories 7 and 8 in order for a new pattern to be displayed on the CRT monitor 10. The graphic memories 7 and 8 are adapted to store the pattern data to be displayed on the CRT monitor 10 and such displays on the CRT monitor 10 can be changed by refreshing the pattern data written in the graphic memories 7 and 8. Display data and instructions are inputted by means of an external device (not shown) including, for example, a keyboard, and are transmitted to an input/output control circuit 9 of display information processing circuit 1 through a signal line 12. The input/output control circuit 9 converts the data and instructions into signal forms that can be processed by the CPU 2, transfers the signal forms to the CPU 2 and transmits responses from the CPU 2 to the external device. The CRT monitor 10 displays characters and graphics on its screen. The invention is in no way limited to the use of the CRT monitor but may be applicable to a printer and other types of display, such as a liquid crystal display. A CPU bus 11 couples the CPU 2 to the program memory 3, CG 4, CRTC 5 and peripheral control circuit 6 so that signals may be transferred through the CPU bus 11.

Figure 2:
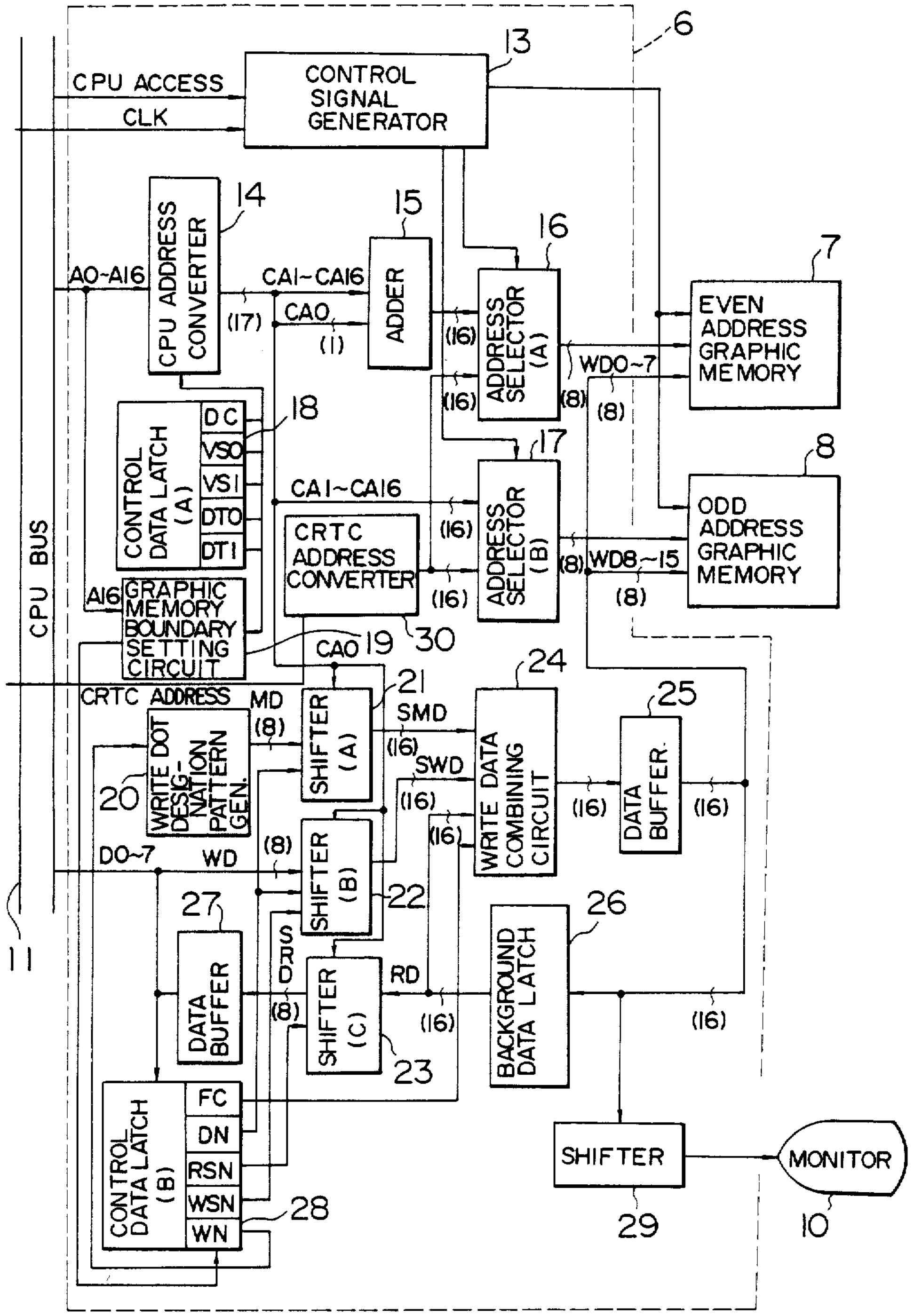
FIG. 2 is a block diagram detailing a peripheral control circuit in the display information processing circuit of the invention shown in FIG. 1.

FIG. 2 details the peripheral control circuit 6 shown in FIG. 1.

In response to a CPU access signal and an operation clock signal CLK, a control signal generator 13 transmits a register selection signal to a control data latch (A) 18, a control data latch (B) 28 or one of registers (not shown) of a CRTC address converter 30, the latch (A) 18, latch (B) 28 and converter 30 being included in the peripheral control circuit 6, so as to write data from the CPU into the control data latch (A) 18, control data latch (B) 28 or one register of the CRTC address converter 30; transmits a data latch signal and a data output signal to a background data latch 26 and a data buffer 25 and transmits a CPU address selecting signal to an address selector (A) 16 and an address selector (B) 17 concurrently with generation of a control signal applied to the graphic memories 7 and 8, so as to write the data from the CPU 2 into the graphic memories 7 and 8; transmits the data latch signal to the background data latch 26 and a data output signal to a data buffer 27 and transmits the CPU address selecting signal to the address selector (A) 16 and address selector (B) 17 concurrently with the generation of a control signal applied to the graphic memories 7 and 8, so as to write data from the graphic memories 7 and 8 into the CPU 2; or transmits a CRT address selecting signal to the address selector (A) 16 and address selector (B) 17 concurrently with the generation of a control signal applied to the graphic memories 7 and 8 and generation of a data latch signal applied to a shifter 29, so as to write a video signal to be displayed on the CRT monitor 10 into the shifter 29.

Figure 3:
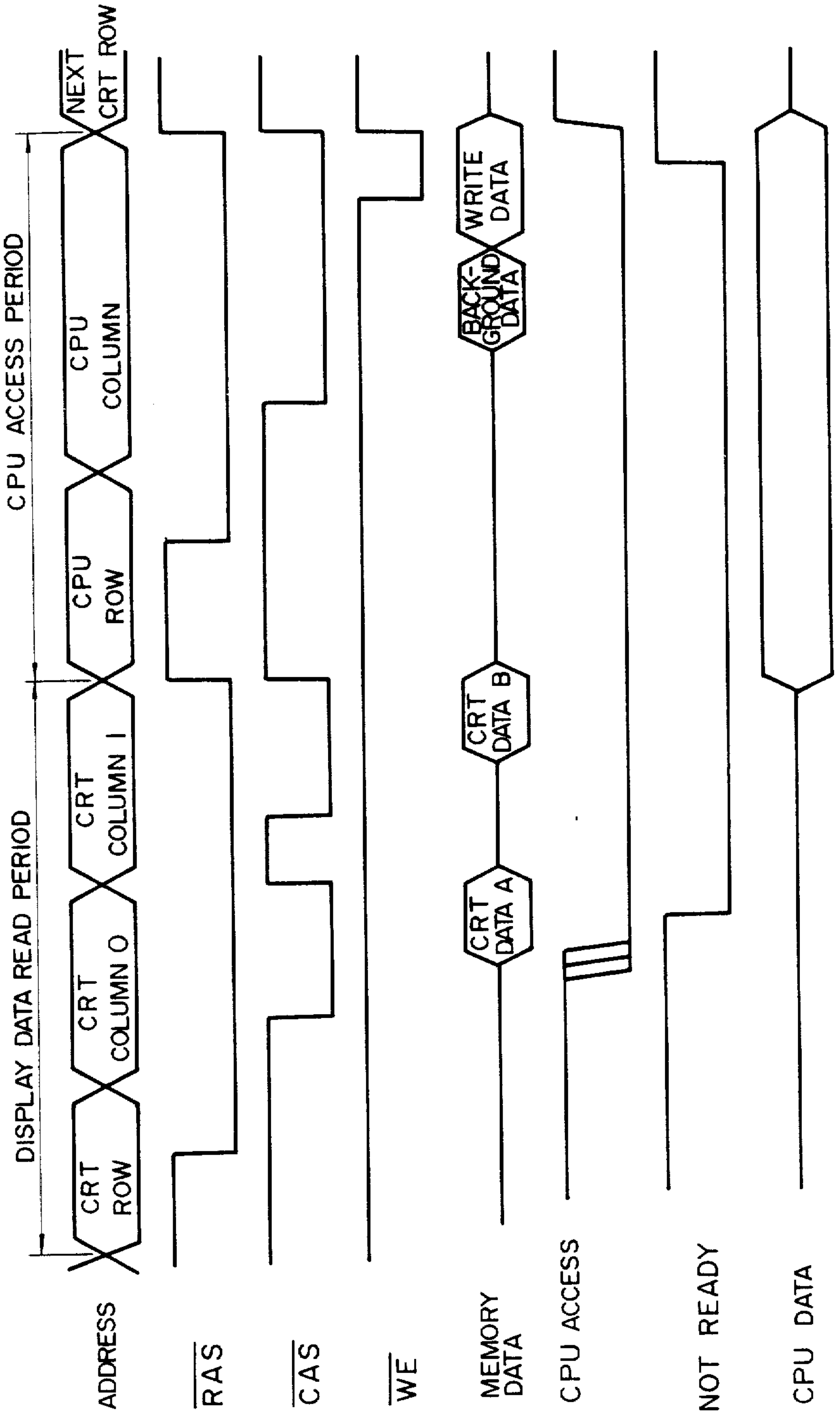
FIG. 3 is a diagram illustrating timings for operations when the peripheral control circuit accesses graphic memories.

The graphic memories 7 and 8 are accessed in accordance with timings as shown in FIG. 3. More particularly, a period during which data read out by the preceding display data read accessing operation is being sent in the form of a video signal to the CRT monitor 10 is divided into a display data read period and a CPU access period which are prepared for the subsequent accessing. During the first time-divisioned period, the graphic memories of different addresses are accessed to read the subsequent display data and during the second time-divisioned period, the CPU is caused to write or read the graphic memories.

Figure 4:
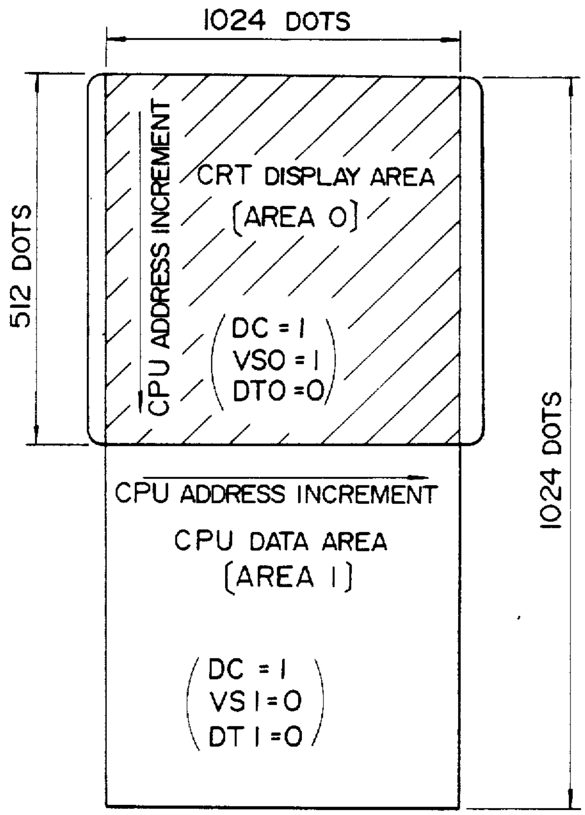
FIG. 4 is a diagram for explaining area division on the graphic memory.
Figure 6:
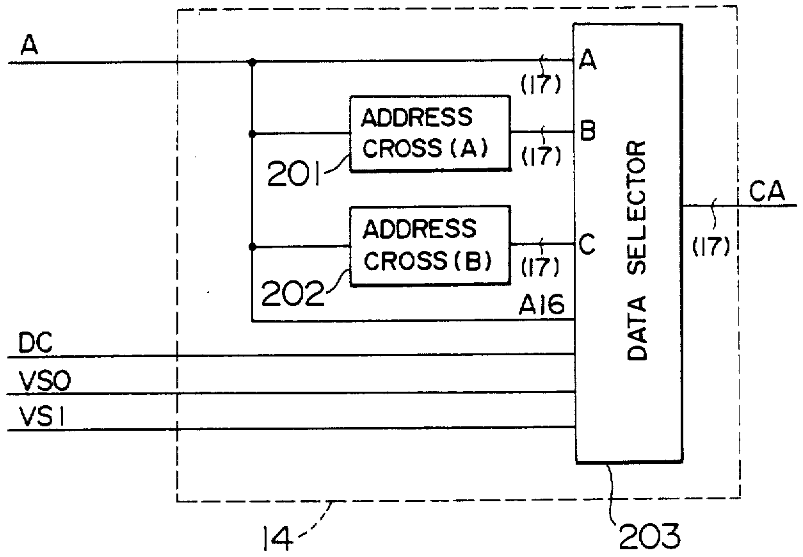
FIG. 6 is a block diagram of an address converter in accordance with the invention.

Exemplarily, each of the graphic memories 7 and 8 has a structure of horizontal 1024 dots (128 bytes)×vertical 1024 dots as shown in FIG. 4. In an instance wherein the display raster size of the CRT monitor 10 does not exceed a size of horizontal 1024 dots×vertical 512 dots, a hatched area in FIG. 4 corresponds to a CRT display screen. The hatched area is then defined as "area 0" which is used to store CRT display pattern data. The other area is defined as "area 1" which stores data used by the CPU 2 during execution of the programs. For the "area 0", a CPU address converter 14 converts an address signal represented by A0–A16 into a vertical type address structure in which the byte address is sequentially incremented in the vertical direction, to thereby speed up the display processing for the CRT monitor 10 and for the "area 1", it converts the address signal into a horizontal type address structure in which the byte address is sequentially incremented in the horizontal direction. Where the size of the display data for the CRT monitor 10 exceeds 512 dots in the vertical direction, the "area 0" and "area 1" of each of the graphic memories 7 and 8 are both used as an area for storing data to be displayed on the CRT monitor 10 and the vertical type address structure for vertical sequential increment of the byte address is employed for this area, thereby speeding up the write processing of display data such as characters. The address conversion is effected by converting the address signals A0–A16 from the CPU 2 into address signals represented by CA0–CA16 which in turn is applied to the graphic memories 7 and 8. The converted address signals CA0--CA16 are indicative of an effective byte signal and correspond to the CPU address signals A0–A16 as shown in FIG. 5. The CPU address converter 14 comprises, as illustrated in FIG. 6, an address cross (A) 201, an address cross (B) 202 and a data selector 203. Applied as control signals to the data selector 203 are output signals of registers DC, VS0 and VS1 (hereinafter the output signals are also designated by DC, VS0 and VS1) included in the control data latch (A) 18 and a bit A16 of the CPU address signal. The address signals A0–A16 from the CPU 2 are converted by the address cross (A) 201 into the effective byte address signals CA0–CA16 in accordance with the correspondence of a vertical address (A) in FIG. 5 and converted by the address cross (B) 202 into the effective byte address signal CA0–CA16 in accordance with the correspondence of a vertical address (B). Consequently, as shown in FIG. 7, byte addresses of each of the graphic memories 7 and 8 as viewed from the CPU 2 are converted, in accordance with the address conversion modes, from effective byte addresses which sequentially increment in the horizontal direction in each graphic memory 7 or 8.

Conversely speaking, even if the address of each graphic memory 7 or 8 as viewed from the CPU 2 is the vertical address and the CPU 2 generates the corresponding address, the effective byte address CA0--CA16 produced from the CPU address converter 14 becomes the horizontal address which sequentially increments in the horizontal direction in each graphic memory 7 or 8.

An adder 15 adds bits CA1 to CA16 and a bit CA0 of the effective byte address and when the effective byte address converted from the address signal transmitted from the CPU 2 to the graphic memories 7 and 8 is odd, the adder 15 delivers to the even address graphic memory 7 an even address which adjoins the odd address in the address increment direction. In this case, the bits CA1 to CA16 of the effective byte address are directly applied to the odd address graphic memory 8.

Figure 18A:
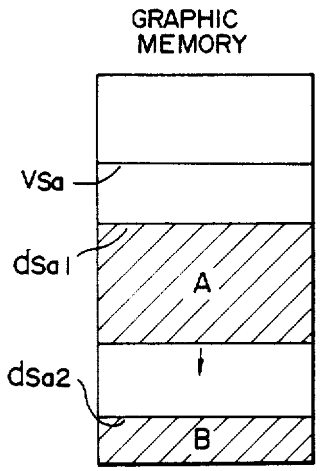
FIGS. 18A and 18B diagrammatically show the relation between the graphic memory and CRT monitor (display screen) shown in FIG. 2.
Figure 18B:
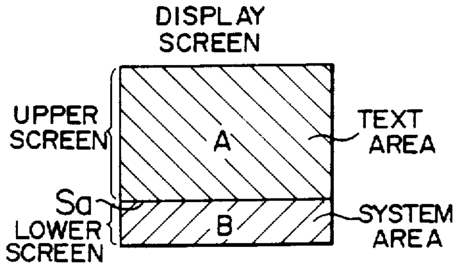

When the effective byte address is even, the bit CA0 is "0" and so the bits CA1 to CA16 of the effective byte address are directly applied to the even address graphic memory 7 and odd address graphic memory 8. Thus, when the effective byte address is even, 16 bits can be collectively selected over the even address graphic memory 7 designated by the effective byte address and the odd address graphic memory which adjoints the even address graphic memory in the address increment direction and when the effective byte address is odd, 16 bits can be collectively selected over the odd address graphic memory designated by the effective address and the even address graphic memory which adjoins the odd address graphic memory in the address increment direction.

Where the display screen of the CRT monitor 10 is divided into a text area and a system area, the CRTC address converter 30 carries out address conversion such that a wraparound screen can be established for each divisional area. FIG. 18A shows a state in which data for a text area A and data for a system area B are stored in a graphic memory. FIG. 18B shows a state in which the data for either of the areas A and B are read out of the graphic memory and displayed on the screen. The text area is for displaying characters and graphics and the system area is used to display data for processing the characters and graphics, for example, pages, lines and display mode names. In this embodiment, the text area A is scrolled upwards and beneath the text area A, a new text area C is established on which new characters or graphics are displayed. The system area B must however remain fixed at the lowermost part of the screen even when the area A is scrolled and the new area is interposed.

Figure 17:
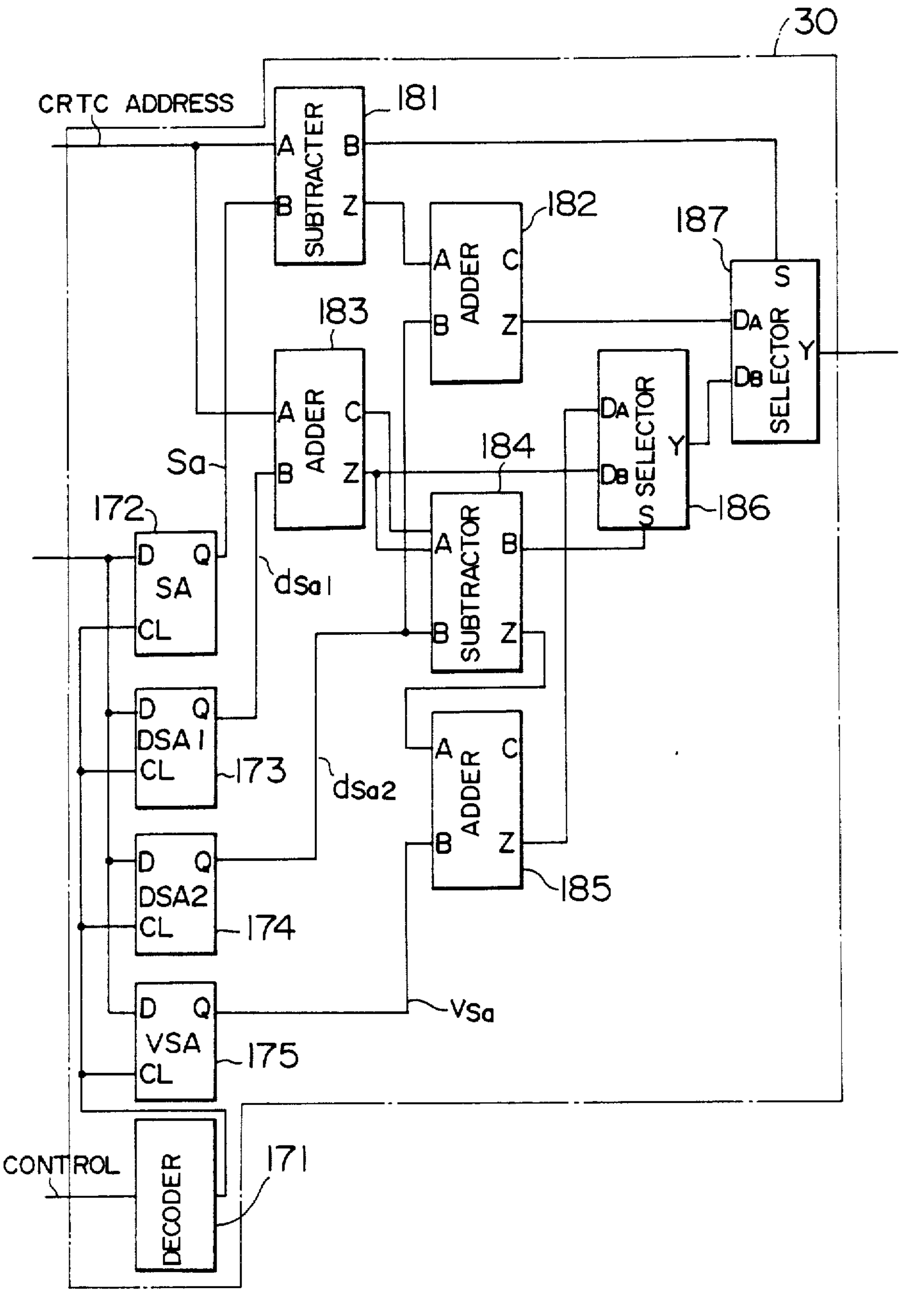
FIG. 17 is a block diagram detailing a CRTC address converter shown in FIG. 2.

The CRTC address converter 30 converts a screen refresh address signal (ra) from the CRTC 5 into a modified address (mra) which in turn is applied to the address selector (A) 16 and address selector (B) 17. As shown in FIG. 17, the CRTC address converter 30 comprises CRTC address refresh control registers 172, 173, 174 and 175 for storing an address necessary to perform an operation for establishment of a wraparound screen within a divisional screen, a decoder 171 responsive to a CPU access signal to transmit a register selection signal to one of the CRTC address refresh control registers 172, 173, 174 and 175 and to generate a control signal which causes data from the CPU 2 to be written into a selected register, and a set of adders 182, 183, 185, substracters 181, 184 and selectors 186, 187. The adders, subtracters and selectors cooperate together to convert the screen refresh address signal (ra) from the CRTC 5 into the modified address (mra) by which the operation for establishment of the wraparound screen can be performed within the screen in accordance with the address set in the CRTC refresh control registers 172, 173, 174 and 175. The operation of wraparound screen by the CRTC address converter 30 will be detailed later.

In particular, the decoder 171 decodes the command supplied from the CPU through the CPU bus and applies the decoded command to a selected register. The register 172 stores a start address (a value of output address from the CRTC 5) for a lower divisional screen and will hereinafter be referred to as an SA register. The register 173 stores a display start address for an upper divisional screen in the display area on the graphic memory and will hereinafter be referred to as a DSA1 register. The register 174 stores a display start address for a lower divisional screen in the display area on the graphic memory and will hereinafter be referred to as a DSA2 register. The register 175 stores an initial address for the upper divisional screen on the graphic memory and will hereinafter be referred to as a VSA register.

Figure 20:
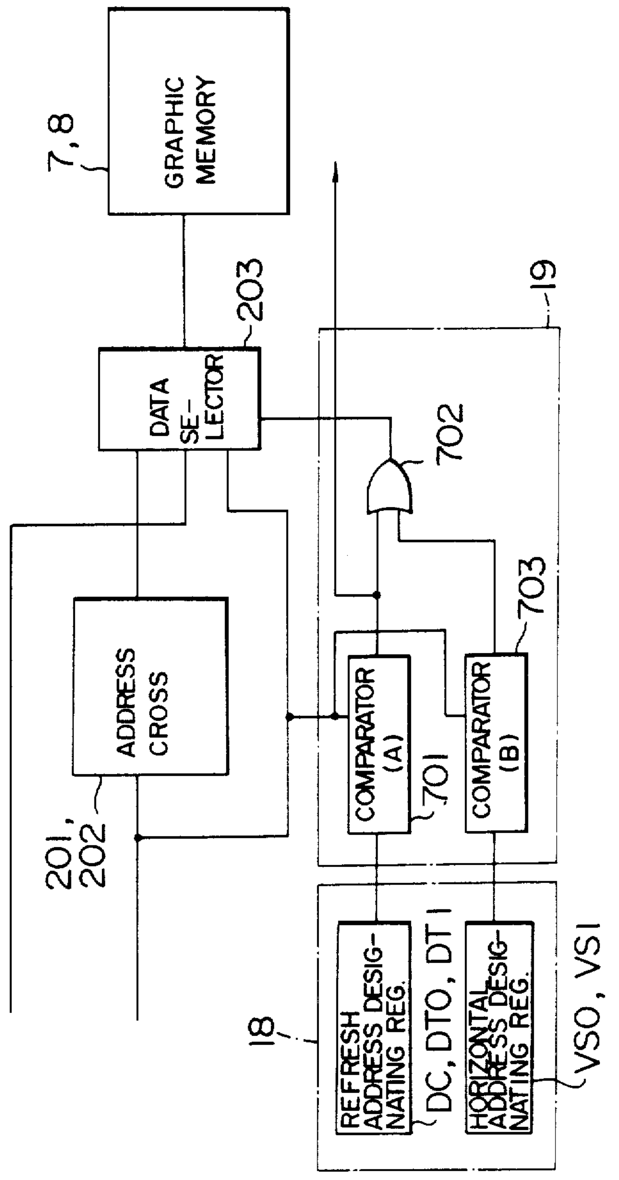
FIG. 20 is a block diagram detailing a graphic memory boundary setting circuit shown in FIG. 2.

A graphic memory boundary setting circuit 19 is responsive to the address signal A16 from the CPU 2 and control signals from the control data latch (A) 18 and it generates, when the CPU 2 accesses the "area 1" (FIG. 4) of the graphic memory 7 or 8, a signal which places a data shifting and combining section to be described later in a mode wherein the amount of shift in a data shift/combine processing performed by the data shift/combine section is forcibly made zero and hence data from the CPU 2 is freed from the combinative processing so as to be directly delivered out of the data shift/combine section, the signal being referred to as a data-through signal in the following description. The graphic memory boundary setting circuit 19 comprises, as shown in FIG. 20, a comparator (A) 701 for comparing an address signal from the CPU 2 with values of the refresh address designating registers (DC, DT0 and DT1) included in the control data latch (A) 18 and producing a data-through signal, a comparator (B) 703 for comparing the address signal from the CPU 2 with values of the horizontal address designating registers (VS0 and VS1) adapted to set the "area 0" with a vertical address and the "area 1" with a horizontal address and for producing a horizontal address designating signal, and a logic 702 for ORing the data-through signal and horizontal address designating signal.

The mode in which the amount of shift is forcibly made zero and the data from the CPU 2 is freed from the combinative processing so as to be directly delivered out can be set by transmitting a signal, resulting from ORing or ANDing of the control signal from the control data latch (B) 28 and the data-through signal, to a shifter (A) 21, a shifter (B) 22, a shifter (C) 23 and a write data combining circuit 24.

Figure 9:
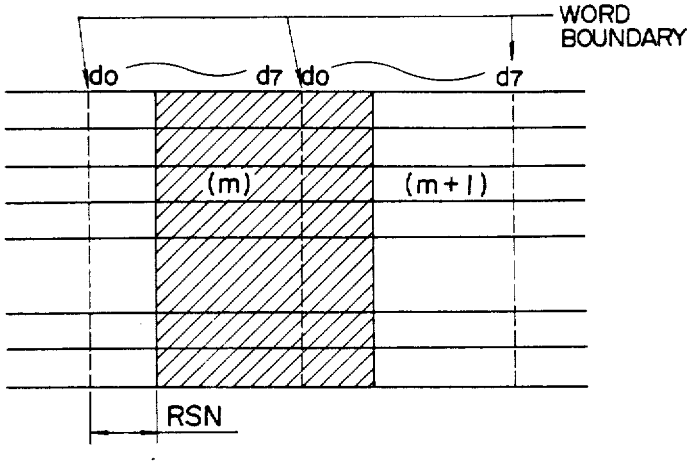
FIG. 9 is a diagram useful in explaining a pattern read position.
Figure 10:
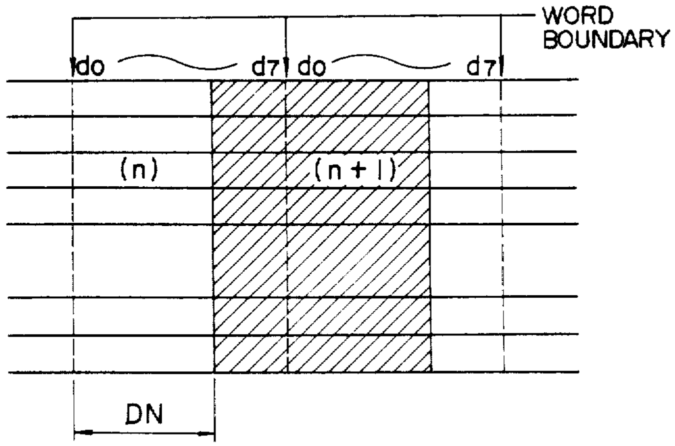
FIG. 10 is a diagram useful in explaining a pattern write position.

The control data latch (B) 28 has a group of data latches FC, DN, RSN, WSN and WN which latch control values for selecting the data shift amount and the combinative mode in the data shift/combine section. Specifically, the data latch FC designates the combinative mode, the data latch DN designates an amount of shift from a word boundary between the graphic memories 7 and 8 for the data written from the CPU 2 to the graphic memories 7 and 8 as illustrated in FIG. 10, the data latch RSN designates an amount of shift from a word boundary between the graphic memories 7 and 8 for data read by the CPU 2 from the graphic memories 7 and 8 as illustrated in FIG. 9, the data latch WSN designates a data start position of the data written from the CPU 2 to the graphic memories 7 and 8 in terms of an amount of shift from a word boundary as viewed from the CPU 2 as illustrated in FIG. 13, and the data latch WN designates a data width of the data written from the CPU 2 to the graphic memories 7 and 8 in terms of the number of bits as illustrated in FIG. 12.

Figure 12:
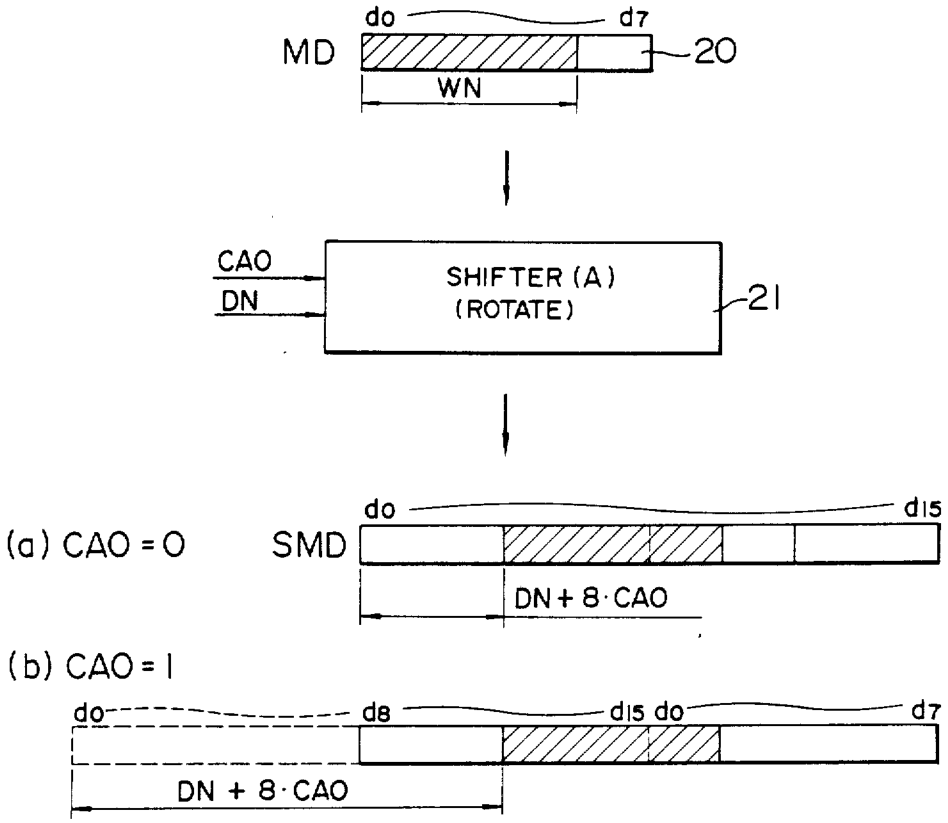
FIG. 12 is a diagram for explaining the operation of a shifter (A)
Figure 13:
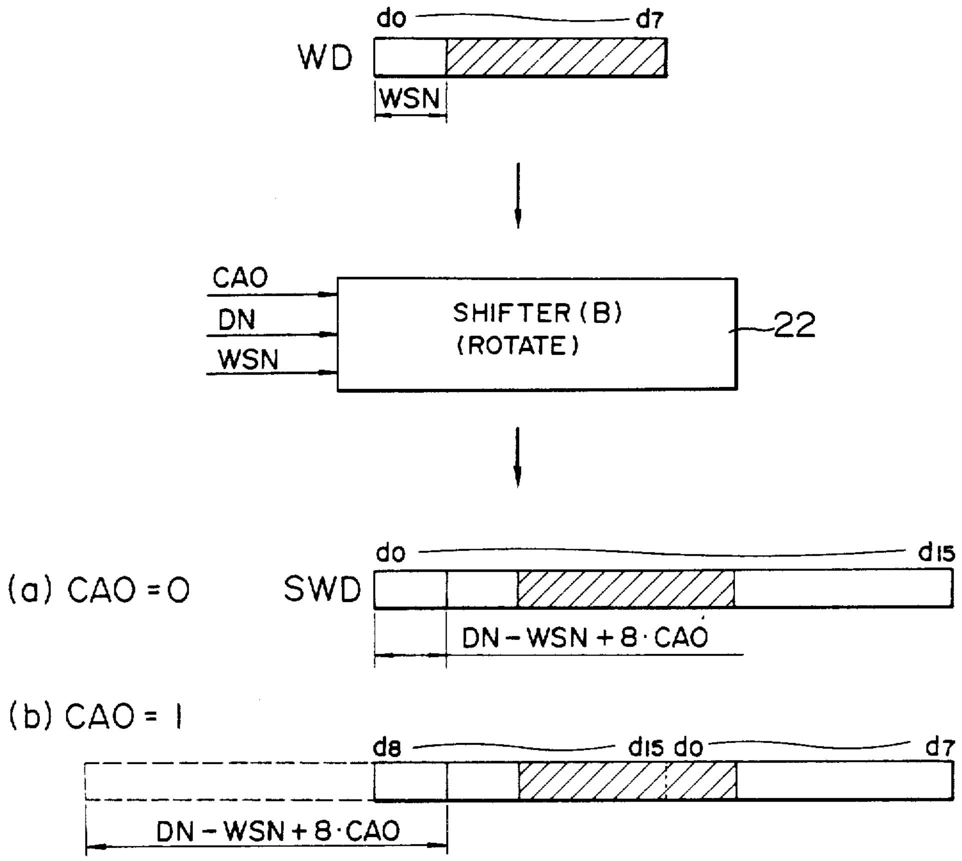
FIG. 13 is a diagram for explaining the operation of a shifter (B)

A write dot designation pattern generator 20 responds to a value of the latch WN of control data latch (B) 28 to generate a write dot designation pattern MD represented by a data string which is "1" throughout bit 1 to bit 8 directed from $d_0$ to $d_7$ as shown in FIG. 12.

The "1" data string is indicated in FIG. 12 by a left-below inclined hatch portion ////////// .

The shifter (A) 21 is a 16-bit data rotator and as shown in FIG. 12, it responds to a value of the latch DN of control data latch (B) 28 and a value of bit CA0 of the effective byte address for graphic memory to rotate the write dot designation pattern MD from $d_0$ toward $d_{15}$, thereby generating a data write position designating pattern SMD. For the effective byte address bit CA0 being "0", the write dot designation pattern MD is rotated to a position corresponding to a shift from $d_0$ by the value of the data latch DN, as illustrated at section (a) in FIG. 12. For the effective byte address bit CA0 being "1", the pattern MD is rotated to a position corresponding to a shift from $d_8$ by the value of the data latch DN, as illustrated at section (b) in FIG. 12.

The shifter (B) 22 is a 16-bit data rotator and as shown in FIG. 13, it responds to values of the data latches DN and WSN of control data latch (B) 28 and the value of the effective byte address bit CA0 for graphic memory to rotate write data WD from $d_0$ toward $d_{15}$, thereby generating a write data rotation pattern SWD. For the effective byte address bit CA0 being "0", the write data WD is rotated to a position corresponding to a shift from $d_0$ by a difference DN-WSN between the values of the data latches DN and WSN as illustrated at section (a) in FIG. 13 and for the effective byte address bit CA0 being "1", the write data WD is rotated to a position corresponding to a shift from $d_8$ by the difference DN-WSN. This ensures that the start position of the write data can coincide with the data write position designating pattern SMD for the data.

The background data latch 26 is responsive to a signal sent from the control signal generator 13 to latch 16-bit background data RD read out of the graphic memories 7 and 8 at a CPU access timing shown in FIG. 3.

In response to the data write position designating pattern SMD delivered out of the shifter (A) 21, the write data rotation pattern SWD delivered out of the shifter (B) 22, the background data RD delivered out of the background data latch 26 and a value of the data latch FC of control data latch (B) 28, the write data combining circuit 24 combines the SWD and RD so that the SWD and RD are ANDed, ORed or exclusive-ORed for a "1" portion of the SMD as indicated by a left-below inclined hatch portion //////////// at sections (a) and (b) in FIG. 14, and directly delivers the RD for the other portion of the SMD as indicated by right-below inclined hatch portions \\\\\\\\ at sections (a) and (b) in FIG. 14. In this manner, the write data combining circuit 24 prepares and delivers the write data written into the graphic memories 7 and 8. For the effective byte address bit CA0 being "0", the write data from the CPU 2 is located at a position corresponding to a rotation from $d_0$ by the value of the data latch DN as illustrated at section (a) in FIG. 14 and for the effective byte address bit CA0 being "1", located at a position corresponding to a rotation from $d_8$ by the value of the data latch DN.

Figure 11:
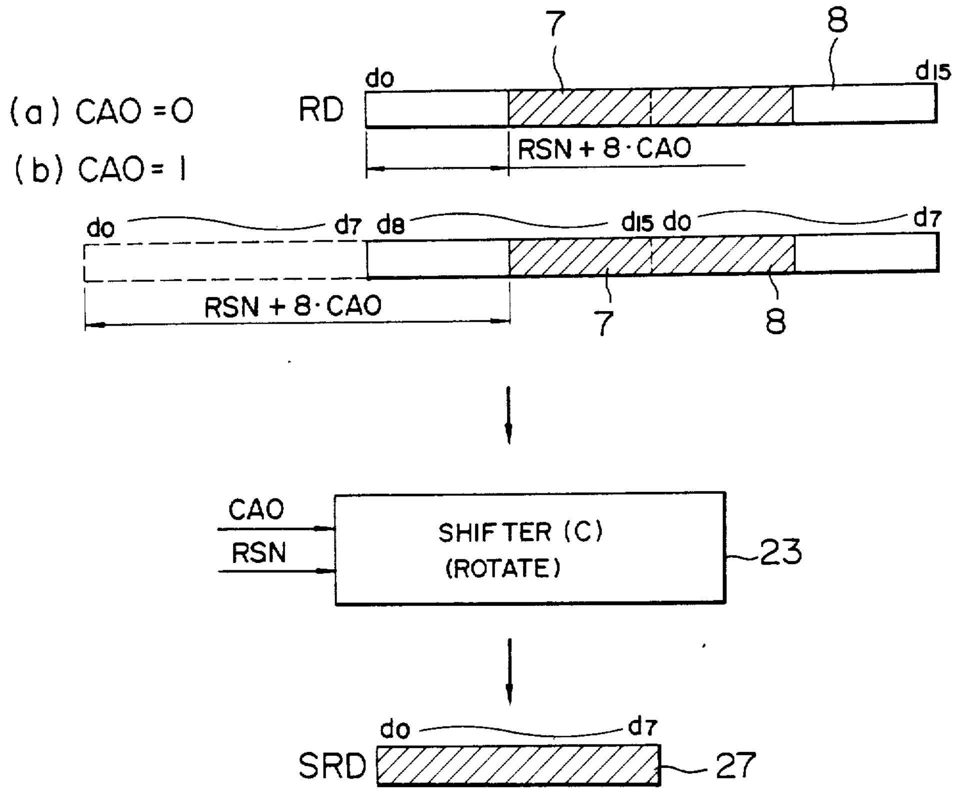
FIG. 11 is a diagram for explaining the operation of a shifter (c)

The shifter (C) 23 is a 16-bit data rotator and as shown in FIG. 11, it responds to a value of the data latch RSN of control data latch (B) 28 and the value of the graphic memory effective byte address bit CA0 to rotate the background data read out of the graphic memories 7 and 8 from $d_{15}$ toward $d_o$, thereby generating CPU read data SRD. For the effective byte address bit CA0 of "0", the background data RD is rotated toward $d_o$ by bits corresponding to the value of the data latch RSN as illustrated at (a) in FIG. 11 and for the effective byte address bit CA0 of "1", rotated toward $d_o$ by bits corresponding to a value (RSN+8) which is the sum of the value of the data latch RSN and 8 as illustrated at (b) in FIG. 11. This ensures that the write data start position can coincide with $d_o$ on the CPU read data SRD.

In response to a signal sent from the control signal generator 13, the shifter 29 latches display data of 32 bits which is read twice, partly out of the graphic memory 7 and partly out of the graphic memory 8, at display data read timings shown in FIG. 3 and sequentially shifts the display data to convert it into serial data which in turn is delivered out of the shifter 29.

In FIG. 2, parenthesized numerals allotted to signal lines indicate the number of signal conductors of the corresponding signal lines.

The display information processing circuit having the above-described construction operates as will be described below.

When display data and a display command from the external device are inputted to the input/output control circuit 9 through the signal line 12, the CPU 2 detects the data and command and analyzes the display command to start an operation for display.

When the operation is for displaying a character pattern stored in the CG 4, an address of the character pattern stored in the CG 4, write addresses on the graphic memories 7 and 8 to which data of the pattern to be displayed is written, a shift value DN, a combining designation value FC, a write data head position designating value WSN and a write data width designating value WN are computed and thereafter, the shift value DN, combining designation value FC, write data head position designating value WSN and write data width designating value WN are written into the corresponding data latches of the control data latch (B) 28. Subsequently, the pattern data to be written into the graphic memories 7 and 8 is read out of the address on the CG 4 and written into the corresponding addresses on the graphic memories 7 and 8 by way of the peripheral control circuit 6. Then, within the CPU access period during which the CPU 2 accesses the graphic memories 7 and 8 on time-shared basis as shown in FIG. 3, the peripheral control circuit 6 performs a write operation with respect to the graphic memories 7 and 8 as follows. ① The CPU address converter 14 prepares a write effective byte address n for the graphic memories 7 and 8. ② The adder 15, address selector (A) 16 and address selector (B) 17 cooperate together, so that (a) when n is even, the effective byte address n is applied to the even address graphic memory 7 and an effective byte address n+1 is applied to the odd address graphic memory 8 and, (b) when n is odd, the effective byte address n+1 is applied to the even address graphic memory 7 and the effective byte address n is applied to the odd address graphic memory.

Figure 14:
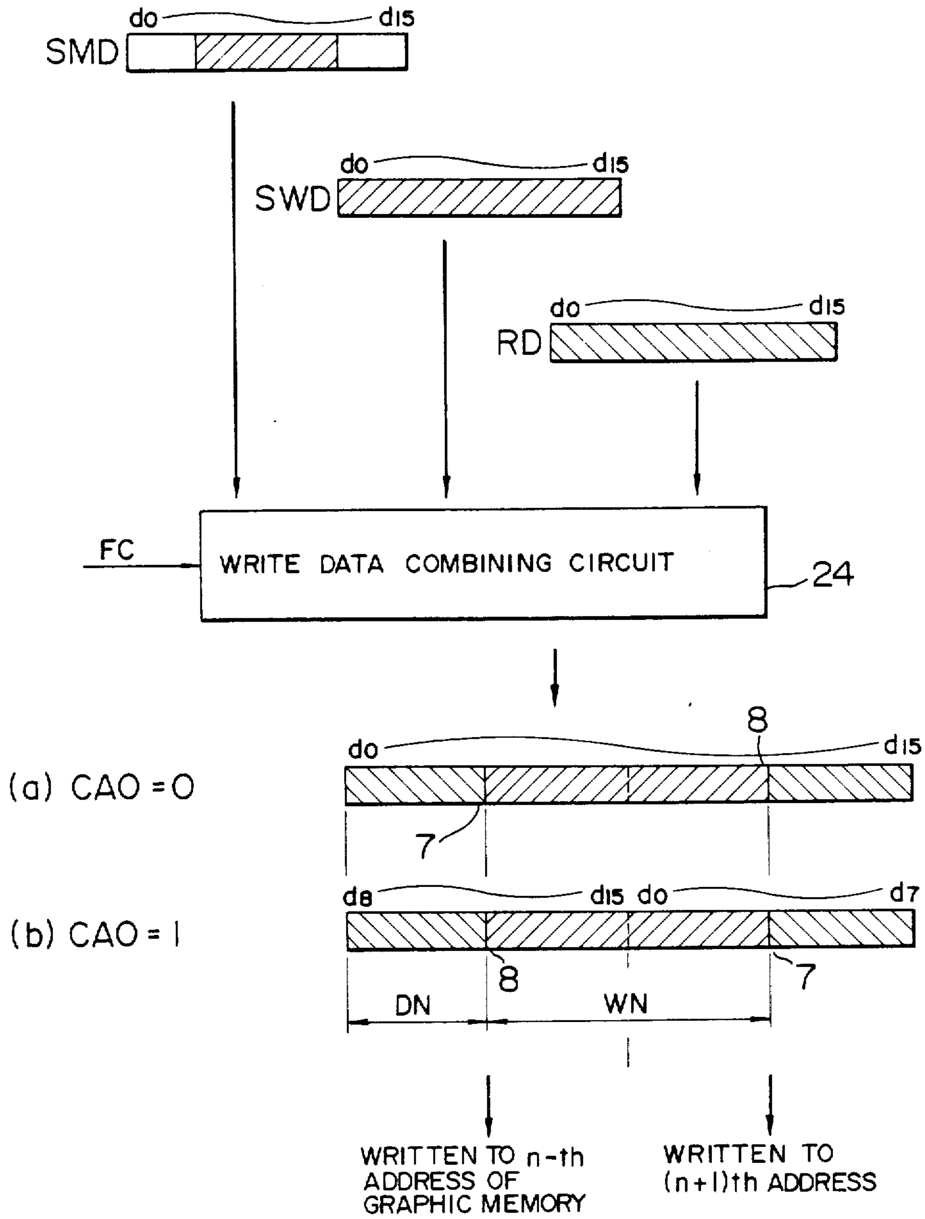
FIG. 14 is a diagram for explaining the operation of a write data combining circuit.

This ensures that with the effective byte address n being even, 16 bits can be collectively selected over the even address graphic memory 7 designated by the effective byte address n and the odd address graphic memory 8 which adjoins the even address graphic memory 7 in the address increment direction, and that with the effective byte address n being odd, 16 bits can be collectively selected over the odd address graphic memory 8 designated by the effective byte address n and the even address graphic memory 7 which adjoins the odd address graphic memory 8 in the address increment direction. ③ Access signals RAS and CAS are sent to the graphic memories 7 and 8, and background data is read out of the addresses selected in ② above and latched in the background data latch 26, thus obtaining background data RD. ④ In parallel with the execution of ③ above, the write pattern generator 20, shifter (A) 21, shifter (B) 22 and write data combining circuit 24 cooperate together, so that as shown in FIG. 14, (a) when n is even, data having the write pattern at a position corresponding to a bit-shift from $d_0$ by the value DN are generated from 16 bits starting from $d_0$ and, (b) when n is odd, data having the write pattern at a position corresponding to a bit-shift from $d_8$ by the value DN are generated from 16 bits starting from $d_8$. ⑤ Upon completion of the background data latch operation described in ③ above, the write data generated in ④ above is sent to the graphic memories 7 and 8 by way of the data buffer 25 and concurrently a data write signal WE is sent to the graphic memories 7 and 8 so as to write the data generated in ④ into the graphic memories 7 and 8.

Figure 15:
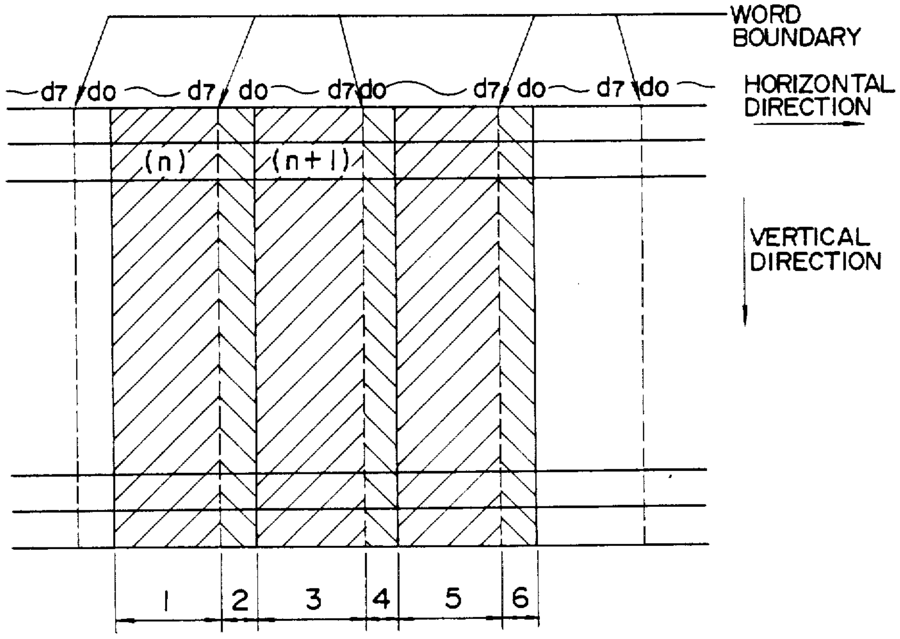
FIG. 15 is a diagram useful in explaining the data read/write operation in accordance with the conventional system.
Figure 16:
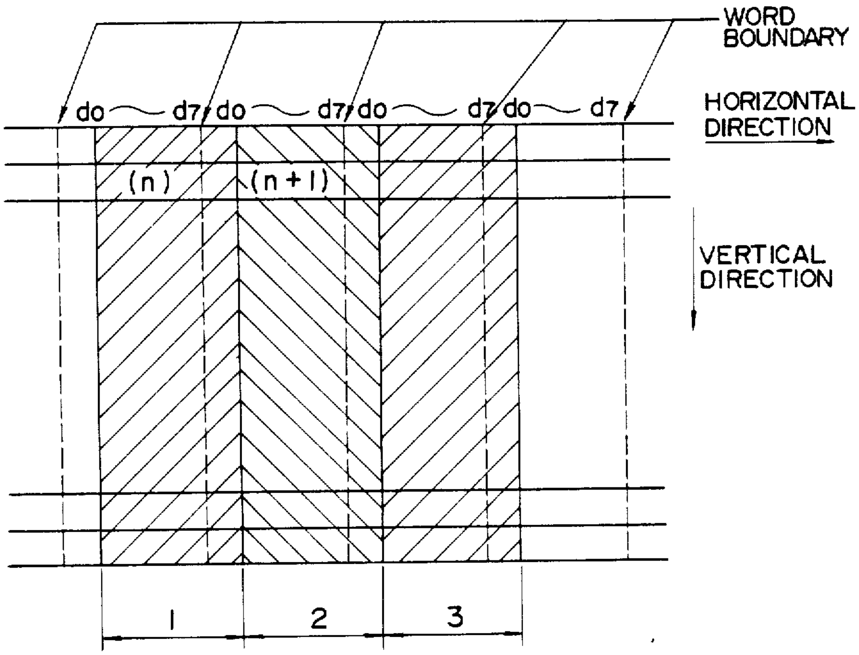
FIG. 16 is a similar diagram in accordance with the invention.

Through the above write operation, even when the pattern data written by the CPU 2 into the effective byte address n shift from a word boundary, the concurrent writing of the write pattern data into the effective byte addresses n and n+1 can be accomplished as best seen from FIG. 16. In contrast to the conventional write operation wherein data is written twice, partly into the effective byte address n and partly into the effective byte address n+1, as illustrated in FIG. 15, the write data can be written into the effective byte address n and n+1 through one write operation in accordance with the foregoing embodiment of the invention and consequently the write processing can be carried out at a high speed which is constant irrespective of the write positions.

Next, a display operation will be described by which a pattern stored in the graphic memories 7 and 8 is displayed at a different position. In the display operation, addresses for a pattern stored in the graphic memories 7 and 8, write addresses for the graphic memories 7 and 8 into which the pattern to be displayed is written, a shift value DN, a combining designation value FC, a write data head position designating value WSN, a write data width designation value WN, and an effective start position designating value RSN for read pattern data are computed and thereafter, the shift value DN, combining designation value FC, write data head position designating value WSN, write data width designating value WN and effective start position designating value RSN are written into the corresponding data latches of the control data latch (B) 28. Subsequently, the pattern to be moved for display at a different position is read out of the corresponding read addresses on the graphic memories 7 and 8 by way of the peripheral control circuit 6 and then written into the corresponding write addresses on the graphic memories 7 and 8 by way of the peripheral control circuit 6. Then, within the CPU access period during which the CPU 2 accesses the graphic memories 7 and 8 a time-share basis as shown in FIG. 3, the peripheral control circuit 6 performs a read operation with respect to the graphic memories 7 and 8 as will be described below and writes the pattern data in accordance with the previously-described write operation. ① The CPU address converter 14 prepares a read effective byte address m for the graphic memories 7 and 8. ② The adder 15, address selector (A) 16, and address selector (B) 17 cooperate together, so that (a) when m is even, the effective byte address m is applied to the even address graphic memory 7 and an effective byte address m+1 is applied to the odd address graphic memory 8 and (b) when m is odd, the effective byte address m+1 is applied to the even address graphic memory 7 and the effective byte address m is applied to the odd address graphic memory 8.

This ensures that with the effective byte address m being even, 16 bits can be collectively selected over the even address graphic memory 7 designated by the effective byte address m and the odd address graphic memory 8 which adjoins the even address graphic memory 7 in the address increment direction, and that with the effective byte address m being odd, 16 bits can be collectively selected over the odd address graphic memory 8 designated by the effective byte address m and the even address graphic memory 7 which adjoins the odd address graphic memory 8 in the address increment direction. ③ Access signals RAS and CAS are sent to the the graphic memories 7 and 8, and data is read out of the addresses selected in ② above and latched in the background data latch 26, thus obtaining background data RD. ④ The shifter (C) 23 operates, so that as shown in FIG. 11, (a) when m is even, a pattern at a position corresponding to a bit-shift from $d_0$ by the value RSN is generated as 8-bit read data from 16 bits starting from $d_0$ and, (b) when m is odd, a pattern at a position corresponding to a bit-shift from $d_8$ by the value RSN is generated as 8-bit read data from 16 bits starting from $d_8$. ⑤ The read data generated in ④ are sent to the CPU 2 through the data buffer 27.

Through the above read operation, even when the pattern read by the CPU 2 from the effective byte address m shifts from a word boundary, the concurrent read of the read pattern from the effective byte addresses m and m+1 can be accomplished as is clear from FIGS. 9 and 11. In contrast to the conventional read operation wherein the pattern is twice read, partly from the effective byte address m and partly from the effective byte address m+1, as illustrated in FIG. 15, the read pattern can be read out of the effective byte addresses m and m+1 through one read operation in accordance with the foregoing embodiment of the invention and consequently the read processing can be carried out at a high speed which is constant irrespective of read positions.

The read operation and write operation described so far can speed up the movement of display on the display screen and the display processing of the pattern data stored in the graphic memories 7 and 8.

Where the "area 0" of each of the graphic memories 7 and 8 is used as the CRT display area and the remaining "area 1" of the graphic memory 7 or 8 is used as the data area for the CPU 2, the pattern display operation is performed as will be described below. When the "area 1" of the graphic memory 7 or 8 is used as the CPU data area, the read/write operation for this area must be performed by making zero the amount of shift of CPU data from a word boundary. To this end, data is written by the CPU 2 into the registers of the control data latch (A) 18 such that control values DC, VS0, DT0, VS1 and DT1 are set to "1", "1", "0", "0" and "1", respectively. This divides the graphic memory 7 or 8, into "area 0" and "area 1" shown in FIG. 4 as viewed from the CPU 2. In the "area 0", the address is incremented in the vertical direction and the previously-described data shift/combining processing is carried out. In the "area 1", the address is incremented in the horizontal direction and instead of the data shift/combining processing, the data-through processing is carried out.

Considering an instance in which the CPU 2 accesses the "area 0" to perform a drawing processing, the CPU 2 takes account of the depth which is 3 bytes in the raster scanning direction and 24 bytes in the raster sequence direction when a character pattern of (24×24) dots is processed. In the 8086 type or 8088 type of device by Intel Corp. exemplarily used as the CPU 2, a string instruction is prepared for a repetitious processing of a sequential address, whereby a designated number of bytes can be transferred from a source address designated in a given register to a destination address within a minimized processing time through a minimal number of instruction steps and with the amount of data for one transfer increased, the effects can be maximized. Accordingly, the addresses for the graphic memories 7 and 8 should be aligned in the raster sequence direction. When the same operation is applied, on the other hand, to a large area containing a continuous raster as in the case of the entire screen clearing, the conventional address alignment in the raster scanning direction is advantageous because the processing need not be switched frequently. Therefore, capability of switching the above two address alignments to each other is preferable for performing various processings.

For character display on the screen by means of the CPU 2, a pattern of a character designated by the CG 4 is written into byte addresses for display on the graphic memories 7 and 8 by using a string instruction. Incidentally, one character typically has a width of 3 bytes but a half-sized character has a width half the 3-byte width, that is, a 1.5-byte width. Accordingly, when even at least one half-sized character is contained in a sentence, the bit position of a character pattern in either of the graphic memories 7 and 8 is 4 bits shifted, resulting in a mismatch. In such an event, any arrangement without the write/read means as shown in FIG. 2 fails to utilize the memory movement based on the string instruction because each time a one byte transfer is effected in transferring a character pattern from the CG 4 to the graphic memories 7 and 8, a bit processing must be undertaken. According to the present invention, however, the bit shift processing and mask processing can be performed without resort to the CPU 2 to permit the string instruction to be utilized for high-speed writing of the character pattern into the graphic memories 7 and 8.

Where the CPU 2 accesses the "area 1", the graphic memory boundary setting circuit 19 responds to an address signal A0–A16 from the CPU 2 to detect that the CPU 2 is accessing the "area 1" and sends a CPU data-through signal to the control data latch (B) 28. In response to the data-through signal, the control data latch (B) 28 sets values FC, DN, RSN, WSN and WN, which values forcibly make the amount of shift zero and release the combinative mode with the result that the input CPU data is directly outputted without being modified. In this way, when the CPU 2 is accessing the "area 1", the unaffected CPU data can be transferred, thereby permitting the use of the "area 1" as a data area and resulting in the efficient utilization of the graphic memories 7 and 8.

Figure 21:
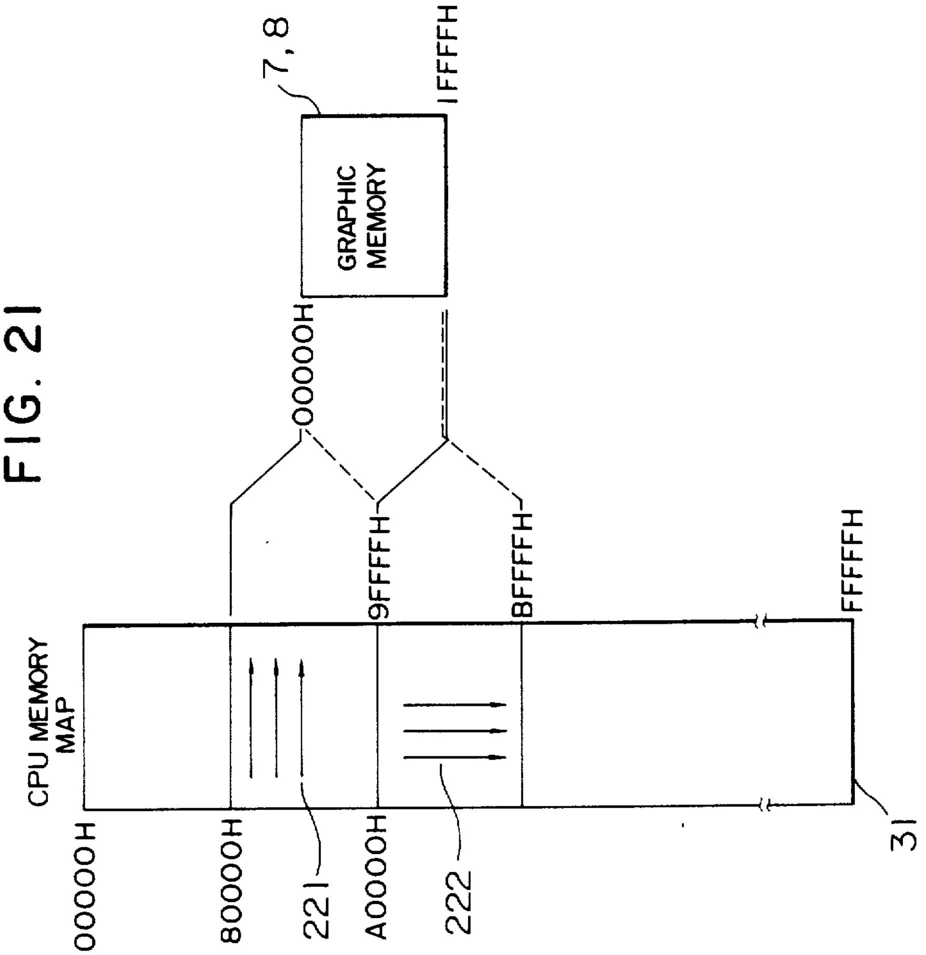
FIG. 21 is a diagram useful in explaining a modification of addressing the graphic memory as viewed from the CPU.

Exemplarily, in the foregoing embodiment, the division into the "area 0" and the "area 1" and the setting of the vertical address, the horizontal address and the data-through condition for the "area 1" are effected by means of the registers of control data latch (A) 18 and the graphic memory boundary setting circuit 19. In an alternative, however, the setting of the vertical address, the horizontal address and the data-through condition for the "area 1" may be effected using a CPU 2 having, as shown in FIG. 21, a CPU memory map 31 on which a plurality of areas 221 and 222 are formed in association with the graphic memories 7 and 8. For example, the area 221 is fixed for setting the horizontal address and data-through condition and the area 222 is fixed for setting the vertical address and data-shift operation condition. For accessing the display area of either of the graphic memories 7 and 8, the CPU 2 accesses the area 222 and when accessing the data area of either of the graphic memories 7 and 8, the CPU 2 accesses the area 221. In this manner, the same effects as those by the foregoing embodiment can be attained.

Turning to the circuit block diagram of FIG. 17, the operation for establishment of a wraparound screen within the divisional screen will now be described by referring to FIGS. 18A, 18B, 19A and 19B diagrammatically showing the relation between the graphic memory and the display screen.

The upper screen is used as a text area and the lower screen is used as a system area.

FIGS. 18A and 18B are illustrative of the operation released from the establishment of a wraparound screen. More particularly, data of the graphic memory 7 or 8 as diagrammatically shown in FIG. 18A is read in accordance with the contents of the DSA1 register 173 and DSA2 register 174 (FIG. 17) which designate a display start area so as to establish a display screen on the CRT monitor 10 as shown in FIG. 18B. When the upper screen designated at A in FIG. 18B is scrolled upwards with the aim of viewing the content of a lower portion of the upper screen A, the CPU 2 rewrites the content of the DSA1 register 173 to an address indicative of an area which is directed downwards as indicated by an arrow in FIG. 18A and writes a text, for example, one line of a newly displayed text, into a newly displayed area of the graphic memory 7 or 8.

By further continuing the scrolling, the areas A and B are eventually joined with each other. Then, as shown in FIG. 19B, the area A is partly cut in accordance with an address value stored in the DSA2 register 174 to permit display of an area C to follow the area A. In this way, the scroll processing can be carried out by setting the DSA1 register 173 so as to write new data into the area corresponding to the area C. Thus, the graphic memory areas shown in FIG. 19A are displayed as shown in FIG. 19B on the display screen.

Figure 19A:
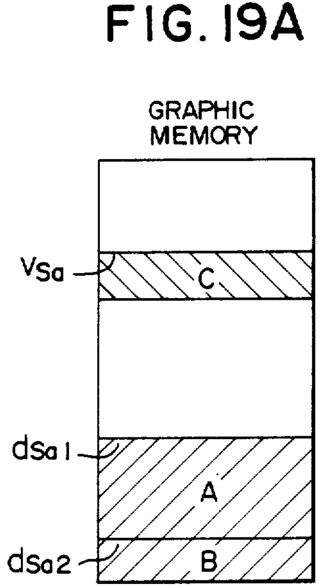
FIGS. 19A and 19B are similar diagrams.
Figure 19B:
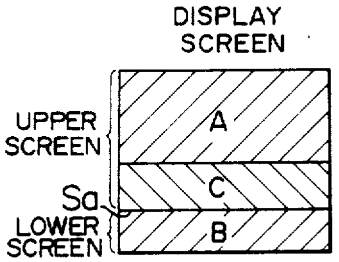

In order to ensure the display operation as illustrated in FIGS. 19A and 19B, the following relational formulae are established in the CRTC address converter 30 of FIG. 17 among the output modified address (mra) from the selector 187, the contents of the registers SA, DSA1, DSA2, VSA (indicated by corresponding small letters in FIGS. 17, 18A, 18B, 19A and 19B) and the CRTC address (ra) applied to input terminal A of each of the subtracter 181 and adder 183.

For area A, $$ra < sa,\ ra - sa < 0$$

$mra = ra + dsa1.$

For area B, $ra \geqq sa,\ ra - sa \geqq 0$ $mra = (ra - sa) + dsa2.$

For area C, $$ra + dsa1 \geqq dsa2$$
$$ra - (dsa2 - dsa1) \geqq 0$$
$$mra = \{(ra + dsa1) - dsa2\} + vsa$$
$$= vsa + ra - (dsa2 - dsa1).$$

As is clear from the above, in the write processing for the graphic memory during the screen scroll, the CPU 2 can complete the scroll operation by merely rewriting the DSA1 register 173 and writing the newly displayed area. This can eliminate the necessity of moving all display data in a designated direction as in the case of the conventional screen scroll processing and can therefore permit the screen scrolling to be performed with a minimal number of data processings as compared to the conventional screen scrolling.

Incidentally, if the text area and the system area do not adjoin each other, the conventional display control apparatus can also perform screen scrolling, but when the two areas join together, the movement of a large amount of graphic memory data is inevitably required and consequently the scroll speed is determined by the time for a block of all the display data for the text area to be moved in the designated direction.

Although, in the foregoing embodiment, the establishment of wraparound screen has been described wherein only for illustrative purposes, the screen area in one of the divisional screens defining the text and system areas, i.e., in the text area is subjected to loop-like address conversion to establish the wraparound screen in the designated memory block, the screen scroll processing may be performed for a screen area in the system area or for screen areas in both the text and system areas.

We claim:

1. A display information processing circuit comprising:

memory means including a plurality of memory elements to each of which a respective word address is assigned, each of said elements being accessible in response to a word address to write and read out dot data in a word unit formed with a predetermined number of bits;

data transfer means for producing dot data in a word unit to be written into a memory element, the word address of said memory element in which said dot data is to be stored and a bit number indication signal which indicates a start bit in said memory element for writing said dot data, said bit number indication signal identifying said start bit by a bit number counted (from a boundary between adjacent memory elements;) and a peripheral control circuit connected to receive said dot data, said word address and said bit number indication signal from said data transfer means for selecting the memory element to which said word address is assigned and for beginning the writing of said dot data at said start bit in said selected memory element; wherein said memory means includes an odd address memory part and an even address memory part which are simultaneously accessible, said odd address memory part storing dot data to which odd number word addresses are assigned, said even address memory part storing dot data to which even number word addresses are assigned; and said peripheral control circuit includes write data generation means for simultaneously generating a first part of said dot data to be written in said selected memory element and a remaining part of said dot data which extends beyond a boundary of said selected memory element so as to apply said dot data to said odd address memory part and said even address memory part, and access address generation means for generating an access address of one of said two memory parts corresponding to said selected memory element having said word address produced by said data transfer means and an access address which is adjacent to said word address in the other one of said two memory parts.

2. A display information processing circuit according to claim 1, wherein said write data generation means includes a data rotator having a rotation bit width corresponding to two word units.

3. A display information processing circuit comprising:

memory means including a plurality of memory elements to each of which a respective word address is assigned, each of said elements being accessible in response to a word address to write and read out dot data in a word unit formed with a predetermined number of bits;

data transfer means for producing a word address of a memory element storing dot data to be read out from said memory means and a bit number indication signal which indicates a start bit in said memory element for reading said dot data, said bit number indication signal identifying said start bit by a bit number counted from a boundary between adjacent memory elements; and a peripheral control circuit connected to receive said word address and said bit number indication signal from said data transfer means for selecting the memory element to which said word address is assigned and for beginning the reading out of said dot data from said selected memory element so as to shift said dot data by said bit number and output said dot data; wherein said memory means includes an odd address memory part and an even address memory part which are simultaneously accessible, said odd address memory part storing dot data to which odd number word addresses are assigned, said even address memory part storing dot data to which even number word addresses are assigned;

said peripheral control circuit includes access address generation means for generating a first access address of one of said two memory parts corresponding to said selected memory element having said word address produced by said data transfer means and a second access address which is adjacent to said word address in the other one of said two memory parts, means for simultaneously reading out dot data in a number of bits of two word units from said two memory parts according to said first and second access addresses; and read data generation means for shifting the dot data in two word units simultaneously read out by said reading out means according to said bit number indication signal and then outputting the dot data in only one word unit indicated by said data transfer means.

4. A display information processing circuit according to claim 3, wherein said read data generation means includes a data rotator having a rotation bit width corresponding to two word units.

5. A display information processing circuit, comprising:

memory means including a plurality of memory elements to each of which a respective word address is assigned, each of said elements being accessible in response to a word address to write and read out dot data in a word unit formed with a predetermined number of bits;

data transfer means for producing dot data in a word unit to be written into a memory element, the word address of said memory element in which said dot data is to be stored and a first bit number indication signal which indicates a start bit for writing said dot data in said memory element, said first bit number indication signal identifying said start bit for writing by a bit number counted from a boundary between adjacent memory elements, a word address of a memory element storing dot data to be read out from said memory means and a second bit number indication signal which indicates a start bit for reading out dot data in said memory element which stores dot data to be read out, said second bit number indication signal identifying start bit for reading by a bit number counted from a boundary between adjacent memory elements;

a peripheral control circuit connected to receive said dot data, said word addresses of said memory element in which dot data is to be stored and from which dot data is to be read and said first and second bit number identifying signals from said data transfer means for selecting the memory element having said word address in which data is to be stored and beginning the writing of said dot data at said bit number in said selected memory element and for selecting the memory element having said word address from which dot data is to be read and beginning the reading out of said dot data from said selected memory element so as to shift said dot data by said bit number and output said shifted dot data; wherein said memory means includes an odd address memory part and an even address memory part which are simultaneously accessible, said odd address memory part storing dot data to which odd number word addresses are assigned; and said peripheral control circuit includes access address generation means for generating a first access address of one of said two memory parts corresponding to a selected memory element having a word address produced by said data transfer means and a second access address which is adjacent to said word address in the other one of said two memory part, write data generation means for simultaneously generating a first part of said dot data to be written ins aid selected memory element and a remaining part of said dot data which extends beyond a boundary of said selected memory element so as to apply said dot data to said odd address memory part and said even address memory part, write means for simultaneously writing said dot data in number of bits of two word units outputted from said write data generation means into said two memory parts according to said first and seconds access addresses, means for simultaneously reading out said dot data in a number of bits of two word units from said two memory parts according to said first and second access addresses, and read data generation means for shifting the dot data in two word units simultaneously read out by said reading out means according to said second bit number indication signal and then outputting the dot data in only one word unit indicated by said data transfer means.

6. A display information processing circuit according to claim 5, wherein each of said write data generation means and read data generation means includes a data rotator having a rotation bit width corresponding to two word units.

7. A display information processing apparatus, comprising:

a CRT display having a dot display screen on which an image is displayed according to dot data;

memory means including a plurality of memory elements to each of which a respective word address is assigned corresponding to each of a plurality of dots on said dot display screen, each of said memory elements being accessible in response to a word address to write and read out dot data in a word unit formed with a predetermined number of bits for displaying and refreshing said dot data forming the display on said screen;

a control processing unit for generating a dot data to be displayed on said screen and a address signal indicating a position of said dot data on said screen;

a display control circuit for indicating a position of a dot to be refreshed on the dot display screen; and a peripheral control circuit for writing dot data provided by said control processing unit into the memory element indicated by said address signal and for reading out the dot data from said memory element corresponding to a refresh position indicated by said display control circuit, said peripheral control circuit further including memory control means for managing the display of dot data on said display screen in such a manner that said screen is divided into a plurality of areas and each of said areas is assigned to a respective group of said memory elements and an address converter for addressing a group of memory elements assigned with one of said divided areas in a wraparound manner so as to carry out scrolling of a display within said one of said divided areas.

8. A display information processing apparatus according to claim 7, wherein said address conversion means comprises registers, an address converter and a control signal generator for controlling said registers and address converter, said address converter including adders, subtractors and selectors.

9. A display information processing apparatus, comprising:

a CRT display having a dot display screen on which an image is displayed according to dot data;

memory means including a plurality of memory elements to each of which a respective word address is assigned corresponding to each of a plurality of dots on said dot display screen, each of said elements being accessible in response to a word address to write and read out dot data in a word unit formed with a predetermined number of bits for displaying and refreshing said dot data forming the display on said screen;

a control processing unit for generating a dot data to be displayed on said screen and a address signal indicating a position of said dot data on said screen;

a display control circuit for indicating a position of a dot to be refreshed on the dot display screen; and a peripheral control circuit for writing dot data provided by said control processing unit into the memory element indicated by said address signal and for reading out the dot data from said memory element corresponding to a refresh position indicated by said display control circuit, said peripheral control circuit further including memory control means for managing the display of dot data on said display screen in such a manner that said screen is divided into a plurality of areas and each of said areas is assigned to a respective group of said memory elements and is further assigned to a group of the memory elements for data processing in said control processing unit, and an address converter for converting the addresses of said group of memory elements assigned to said display areas of said screen in such a manner that the order of the addresses in the direction of increment is changed to become equal to an order of addresses assigned with said memory elements in the vertical direction of said dot display screen and the addresses of said group of memory elements assigned to the group of the memory elements for data processing in said control processing unit are converted in such a manner that the order of the addresses in the direction of increment is changed to become equal to an order of addresses assigned to said memory elements in the horizontal direction of said dot display screen.

* * * * *